(12) United States Patent
Black et al.

(10) Patent No.: US 11,826,651 B2
(45) Date of Patent: Nov. 28, 2023

(54) METHODS FOR PROVIDING INTERACTIVE CONTENT IN A VIRTUAL REALITY SCENE TO GUIDE AN HMD USER TO SAFETY WITHIN A REAL WORLD SPACE

(71) Applicant: Sony Interactive Entertainment Inc., Tokyo (JP)

(72) Inventors: Glenn T. Black, San Mateo, CA (US); Michael G. Taylor, San Mateo, CA (US); Todd Tokubo, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/848,795

(22) Filed: Apr. 14, 2020

(65) Prior Publication Data
US 2020/0238177 A1    Jul. 30, 2020

Related U.S. Application Data

(63) Continuation of application No. 15/715,114, filed on Sep. 25, 2017, now Pat. No. 10,617,956.
(Continued)

(51) Int. Cl.
| | |
|---|---|
| *A63F 13/65* | (2014.01) |
| *A63F 13/212* | (2014.01) |
| *A63F 13/5255* | (2014.01) |
| *A63F 13/211* | (2014.01) |
| *A63F 13/213* | (2014.01) |
| *A63F 13/25* | (2014.01) |
| *A63F 13/30* | (2014.01) |
| *G06T 11/60* | (2006.01) |
| *A63F 13/837* | (2014.01) |

(Continued)

(52) U.S. Cl.
CPC ............ *A63F 13/65* (2014.09); *A63F 13/211* (2014.09); *A63F 13/212* (2014.09); *A63F 13/213* (2014.09); *A63F 13/25* (2014.09); *A63F 13/30* (2014.09); *A63F 13/5255* (2014.09); *G06T 11/60* (2013.01); *A63F 13/837* (2014.09); *A63F 2300/8082* (2013.01); *G06F 3/013* (2013.01); *G06T 13/80* (2013.01); *G06T 19/003* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2003/0210228 A1* | 11/2003 | Ebersole | G06F 3/012 345/157 |
| 2016/0350973 A1* | 12/2016 | Shapira | G06F 3/017 |
| 2017/0262046 A1* | 9/2017 | Clement | G02B 27/017 |

* cited by examiner

*Primary Examiner* — Peter J Iannuzzi
(74) *Attorney, Agent, or Firm* — PENILLA IP, APC

(57) ABSTRACT

Methods for providing guidance to a user wearing a head mounted display (HMD) are provided. One example method includes using a camera of the HMD to track the user wearing the HMD in a real-world space, and identifying a safe zone within the real-world space for interacting with a virtual reality space via the HMD. The method further includes detecting movements of the user in the real-world space. The method includes integrating content into the virtual reality space. The content is configured to provide guidance in direction of movement of the user toward the safe zone of the real-world space. If the user continues to move away from safe zone, pausing presentation of the virtual reality space, and resuming the presentation when the user is in the safe zone.

21 Claims, 12 Drawing Sheets

Related U.S. Application Data

(60) Provisional application No. 62/402,053, filed on Sep. 30, 2016.

(51) Int. Cl.
*G06F 3/01* (2006.01)
*G06T 13/80* (2011.01)
*G06T 19/00* (2011.01)

METHODS FOR PROVIDING INTERACTIVE CONTENT IN A VIRTUAL REALITY SCENE TO GUIDE AN HMD USER TO SAFETY WITHIN A REAL WORLD SPACE

CLAIM OF PRIORITY

The present application is a Continuation of U.S. patent application Ser. No. 15/715,114, filed on Sep. 25, 2017 (U.S. Pat. No. 10,617,956, issued on Apr. 14, 2020) and entitled "Methods for Providing Interactive Content in a Virtual Reality Scene to Guide an HMD user to Safety within a Real World Space," which further claims priority to U.S. Provisional Patent Application No. 62/403,053, filed on Sep. 30, 2016, and entitled "Methods for Providing Interactive Content in a Virtual Reality Scene to Guide an HMD user to Safety within a Real World Space," which are incorporated herein.

FIELD OF THE DISCLOSURE

The present disclosure relates to providing interactive content to a virtual-reality scene, to guide a user to remain within a safe zone of interactivity, while wearing a head mounted display.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head mounted display. A head mounted display is worn by the user and can be configured to present various graphics, such as a view of a virtual reality (VR) space. The graphics presented on a head-mounted display can cover a large portion or even all of a user's field of view. Hence, a head-mounted display can provide a visually immersive experience to the user.

It is in this context that embodiments of the disclosure arise.

SUMMARY

Implementations of the present disclosure include methods and systems that are used for processing tracking data of an HMD user and providing guidance information to the HMD user toward a safe interaction zone. The embodiments described herein illustrate techniques for integrating virtual-reality content directly into the existing virtual-reality content, so as to provide indicators and guidance to the user when the user is straying outside of a safe zone in the real world space. In some embodiments, the user can be provided with graphical content directly in the virtual-reality space indicating that the user is approaching or has exited a safe zone for interactivity. The graphical content can be in the form of messages, graphical messages, text messages, audio messages, and the like.

In one embodiment, a method for providing guidance to a user wearing a head mounted display. The method includes tracking the user wearing the HMD in a real-world space. The method also includes identifying the real-world space and a safe zone within the real-world space for interacting with a virtual reality space via the HMD. Then, detecting movements of the user in the real-world space. The method includes integrating content into the virtual reality space to guide the user to stay in the safe zone of the real-world space.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems, computer readable media and cloud systems, for processing tracking data of an HMD user and providing guidance information to the HMD user toward a safe interaction zone. The embodiments described herein illustrate techniques for integrating virtual-reality content directly into the existing virtual-reality content, so as to provide indicators and guidance to the user when the user is straying outside of a safe zone in the real world space. In some embodiments, the user can be provided with graphical content directly in the virtual-reality space indicating that the user is approaching or has exited a safe zone for interactivity. The graphical content can be in the form of messages, graphical messages, text messages, audio messages, and the like.

In some embodiments, the user can be provided with guiding messages that tell the user where to move in order to re-enter the safe zone. In some embodiments, the content is paused while the user attempts to re-enter the safe zone. In further embodiments, graphical content can be integrated directly into the virtual-reality content being interacted by the user, so that the graphical content appears native to the application or current content. In this manner, alerts, guiding instructions, and the like, will appear less disruptive to the HMD experience. Generally speaking, the embodiments described herein provide interactive tracking of the user, and of the real world space, so as to provide a safe interaction zone for the user, in a way that also does not interfere or distract from the rich immersive content being presented by the HMD.

In one embodiment, the methods, systems, image capture objects, sensors and associated interface objects (e.g., gloves, controllers, hands, etc.) are configured to process data that is configured to be rendered in substantial real time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

It will be obvious, however, to one skilled in the art, that the present disclosure may be practiced without some or all of these specific details. In other instances, well known process operations have not been described in detail in order not to unnecessarily obscure the present disclosure.

Figure 1:
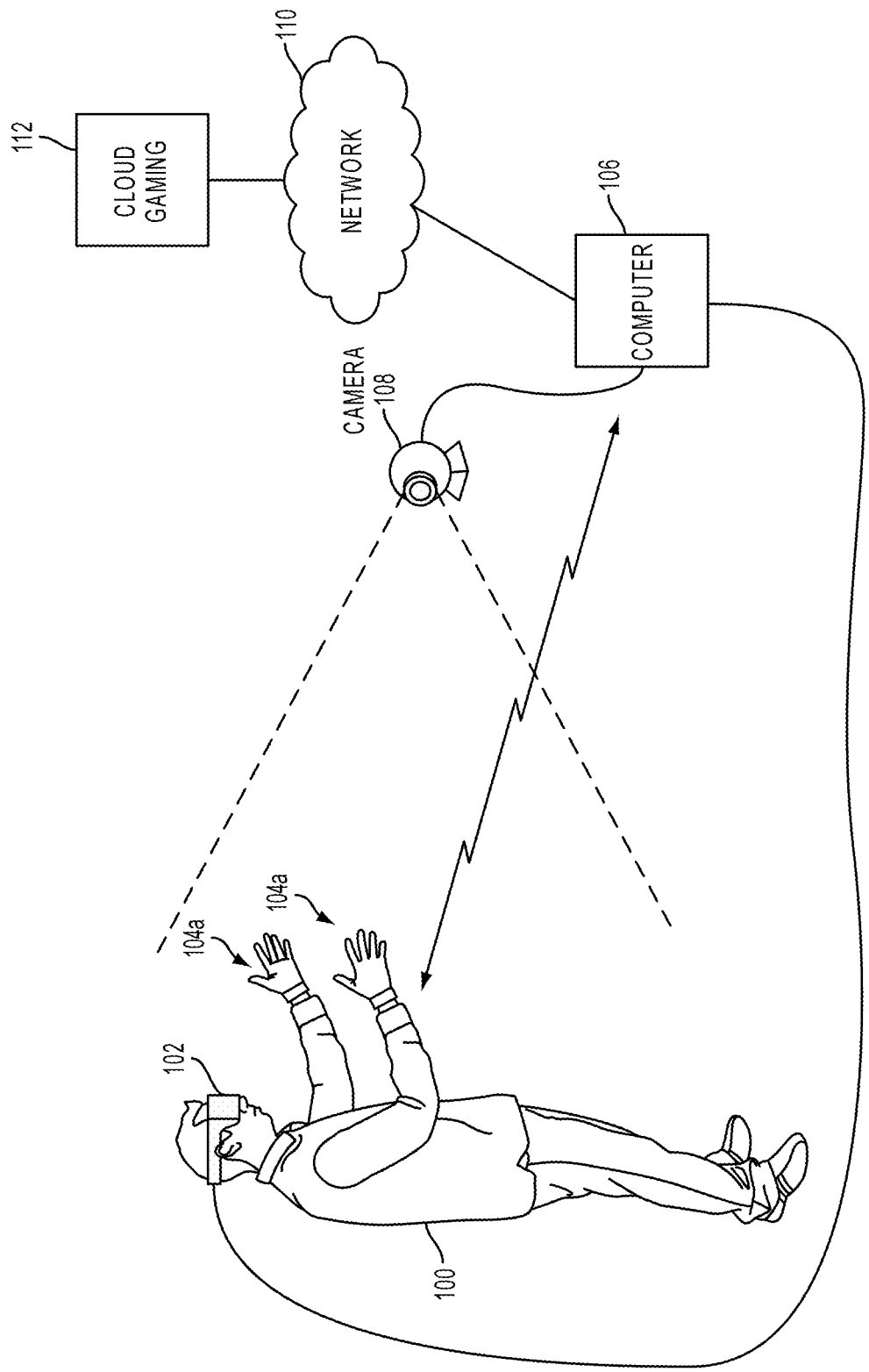
FIG. 1 illustrates a system for interactive gameplay of a video game, in accordance with an embodiment of the disclosure.

FIG. 1 illustrates a system for interactive gameplay of a video game, in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104a to provide input for the video game. Additionally, a camera 108 can be configured to capture images of the interactive environment in which the user 100 is located. These captured images can be analyzed to determine the location and movements of the user 100, the HMD 102, and the glove interface object 104a. In one embodiment, the glove interface object 104a includes a light which can be tracked to determine its location and orientation.

As described below, the way the user interfaces with the virtual reality scene displayed in the HMD 102 can vary, and other interface devices in addition to glove interface objects 104a, can be used. For instance, single-handed controllers can also be used, as well as two-handed controllers. In some embodiments, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104a and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104a.

In one embodiment, the HMD 102, glove interface object 104a, and camera 108, may themselves be networked devices that connect to the network 110 to communicate with the cloud gaming provider 112. For example, the computer 106 may be a local network device, such as a router, that does not otherwise perform video game processing, but which facilitates passage of network traffic. The connections to the network by the HMD 102, glove interface object 104a, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2A:
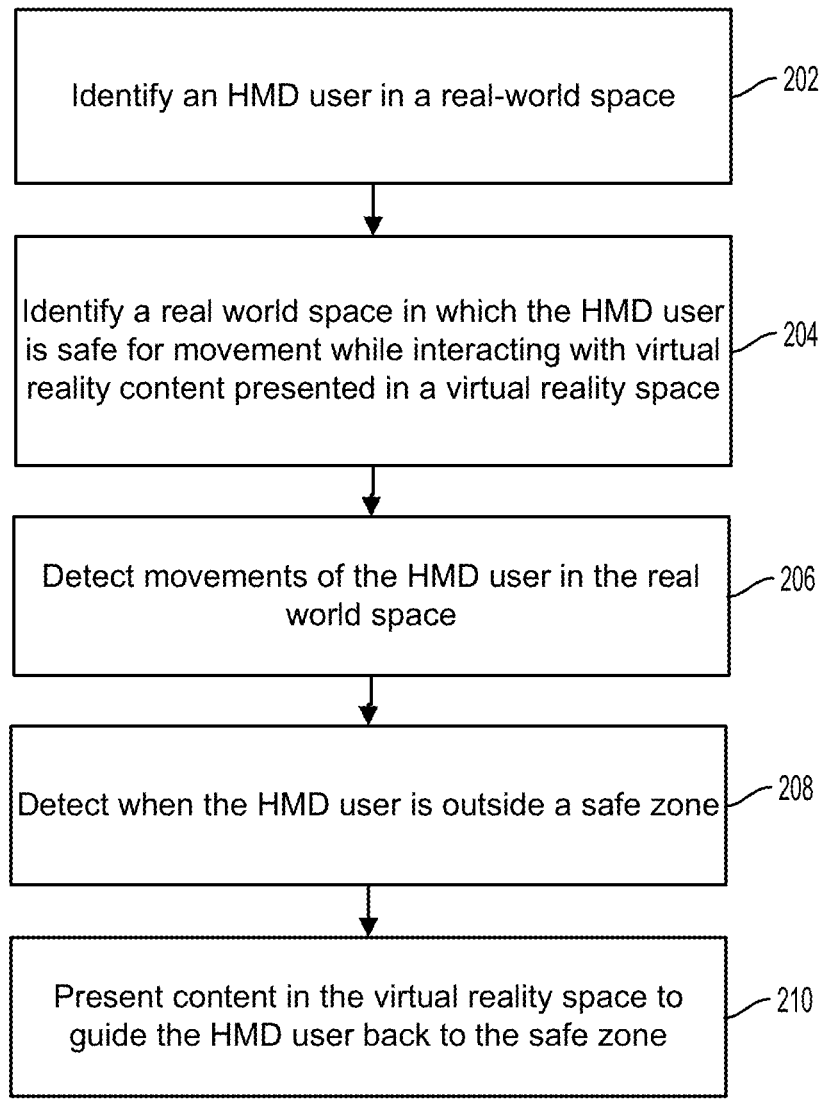
FIG. 2A illustrates a flowchart diagram, describing general features associated with guiding users back to safety during the use of an HMD, in accordance with one embodiment.

FIG. 2A illustrates a flowchart diagram, describing general features associated with guiding users back to safety during the use of an HMD, in accordance with one embodiment. In this example, the method includes operation 202 for identifying an HMD user in a real-world space. The HMD user can be tracked in various ways. In one embodiment, the HMD user can be tracked by tracking the HMD itself, or by tracking images of the user wearing the HMD, or by tracking controllers or trackable objects held or worn by the HMD user. Generally, an HMD user will be interacting with the HMD in a real-world space, where the user can move around.

Moving around can include moving around a space that typically is at least the size of a small room, the room in a user's living room, a special purpose room, a game room, a research room, or generally a space in the real world where the user can move around by walking several steps in different directions. However, because the user is moving around in the interaction space in the real world, the user may not see certain things in the real world because the HMD is being worn. Accordingly, the method further includes identifying a real-world space in which the HMD user is safe to move around while interacting with the virtual-reality content presented in a virtual reality space. The real world space can be identified using a number of techniques.

By way of example, cameras may be used to identify what things that are physical in nature are present where the user intends to use the HMD. Other types of sensors can also be used, such as proximity sensors, optical sensors, ultrasonic sensors, physical sensors, wired sensors, depth camera sensors, and the like. In one embodiment, the identified real space can be the space where the user is intending to interact with the HMD. The space may include, for example, a person's living room. The person's living room can include sofas, chairs, coffee tables, and other furniture or walls. Identification of the real world space where the user will be interacting, may take into account those other objects present in the room. Thus, the space in which the user will interact may not necessarily be perfectly round or circular or oval, but may take on a different space that outlines or is contained within the objects in the room.

In operation 206, movements of the HMD user are detected in the real world space. As mentioned above, the user can be interacting in the real world space by moving around. Moving around may include taking steps in different directions while the HMD is being worn by the user. In the virtual-reality space, the user feels that they are moving around that space, and may lose track of the fact that they are in the real world space and may likely bump into something present in the real world space. For this reason, the information regarding the movements of the HMD user are tracked and detected in operation 206. In operation 208, it is detected that the HMD user is outside of the safe zone. By way of example, the user may have moved too close to an object, approached stairs, approached a couch, approached a coffee table, approached another person, approached a fragile object, approached a dangerous object, approached generally another thing or object in the real world.

Because the user may bump into, break, or be hurt if they run into that particular object that is outside of the safe zone, the user is presented with content in the virtual-reality space in 210, so that the user can be guided back to the safe zone. As used herein, the safe zone is considered the space where the user can freely walk around while using the HMD, and not likely hit a physical object or injure himself. Integrating content into the virtual-reality space may include, generating graphics that are placed within the virtual-reality space that may assist in guiding the user back to the safe zone.

The graphics can include graphics that are similar to those being presented in the virtual-reality space. For example, if the virtual-reality space is a game where the user is playing a sport, a referee in that sport can guide the person back to the safe zone. If the user is walking around a virtual mall, a mall attendant or police can guide the user back to the safe zone. The content presented can therefore be interactive in terms of being graphical in nature, or can also include text and audio. Generally speaking, the content presented in the virtual-reality space is presented in a way that does not substantially interfere with the interactivity in the virtual-reality space for the HMD user. In some embodiments, if the user has come to close to an object or is completely outside of the safe zone, the interactive content presented in the virtual-reality space can be paused.

During the positing of the content, interactive content can be injected or augmented into this to guide the user back to the safe zone. Once the user has moved back into the safe zone, the virtual-reality content is resumed in the virtual-reality space. Resuming the content can include, for example, rewinding slightly backwards from the point of pause, to provide the user with context.

Figure 2B:
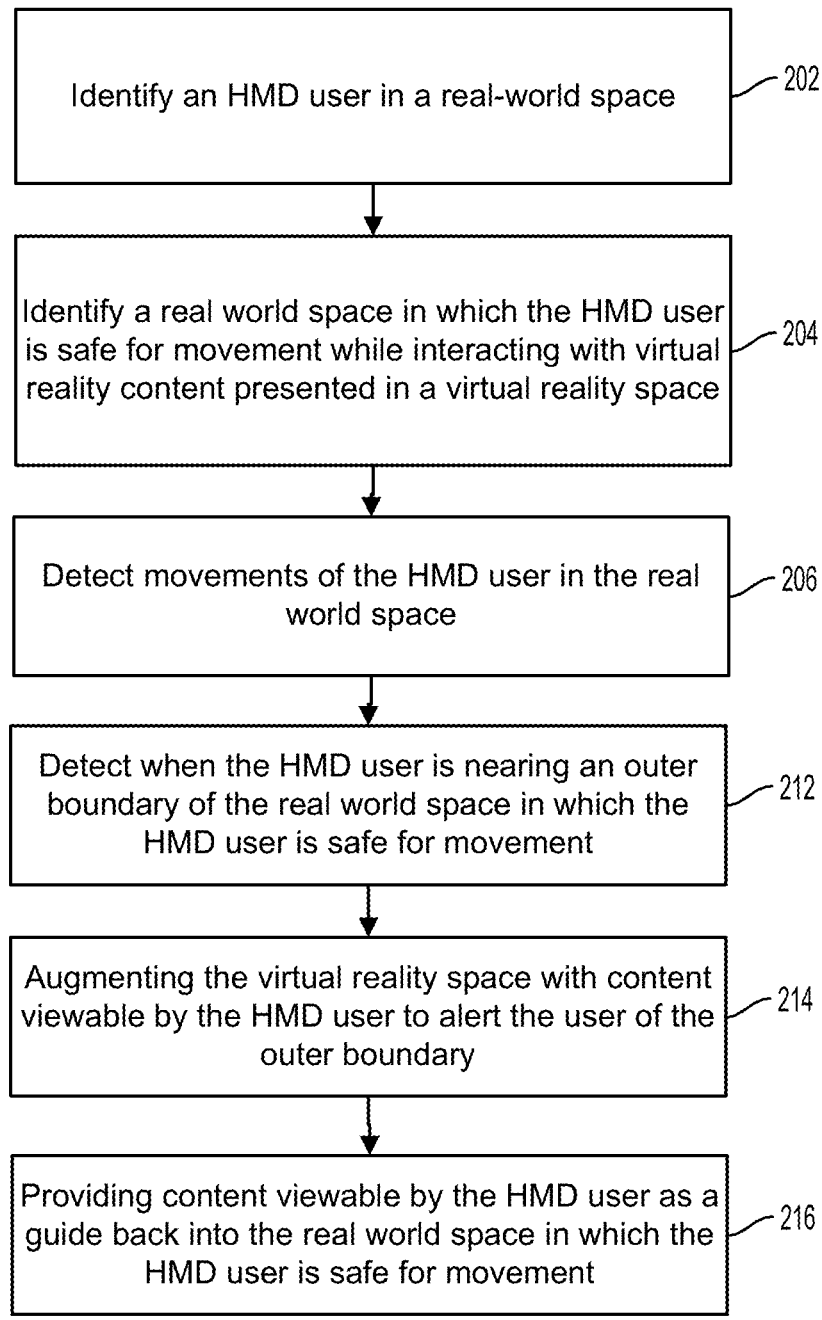
FIG. 2B illustrates another example of operations, as described in FIG. 2A, in accordance with one embodiment.

FIG. 2B illustrates an example of operations 202, 204, and 206, as described in FIG. 2A, in accordance with one embodiment. In this example, operation 212 includes detecting when the HMD user is nearing an outer boundary of the real world space in which the HMD user is safe for movement. This operation can include, tracking the user's movements and predicting that the user is moving too far or may be exiting the real world space that is safe for interaction. In operation 214, the virtual-reality space can be augmented with content viewable by the HMD user to alert the user that the outer boundary is approaching.

In some embodiments, virtual-reality characters can appear in the virtual-reality content, so as to provide the user with information regarding the movement toward the outer boundary. In operation 216, the viewable content provided to the HMD user can include information to guide the user back into the real world space in which the HMD user is safe for movement.

Figure 3:
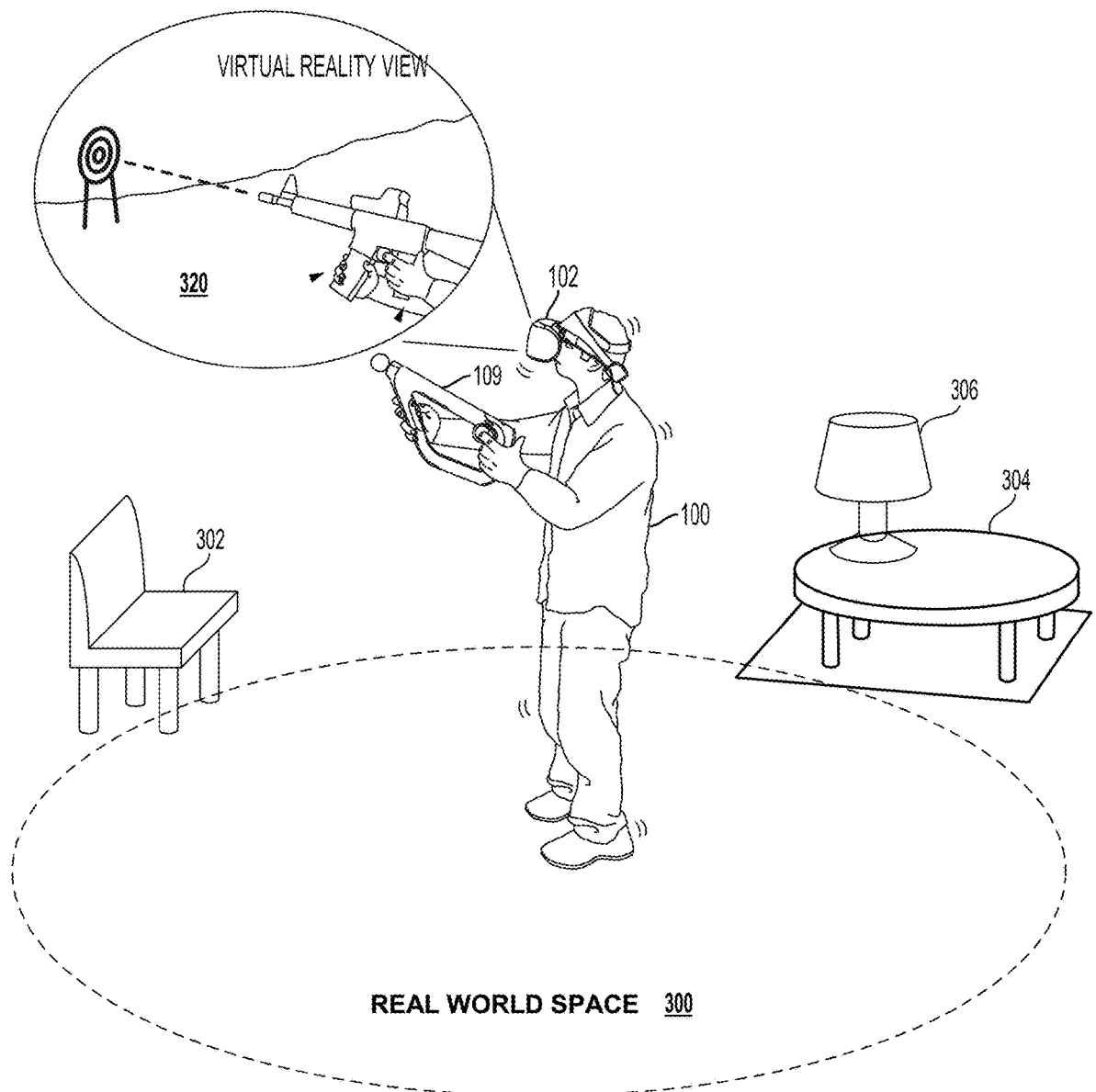
FIG. 3 illustrates an example of a user, wearing an HMD, and interacting with a virtual-reality view.

FIG. 3 illustrates an example of a user 100, wearing an HMD 102, and interacting with a virtual-reality view 320. In this example, the user is interacting with a controller 109, and is playing target practice in the virtual-reality view. As the user moves around the real world space 300, the user may bump into objects in the real world, such as chair 302, coffee table 304, and lamp 306, and other objects. These objects are presented in FIG. 3 simply as an example of physical real world objects that may be located in and around the real world space 300 in which the user should be safe to walk around.

The dashed area highlighted in FIG. 3, in one example, signifies the area that is safe for the user to walk around. If the user walks to the outer boundaries of that dashed line, the user can be presented with guidance back to the safe zone as described above.

Figure 4A:
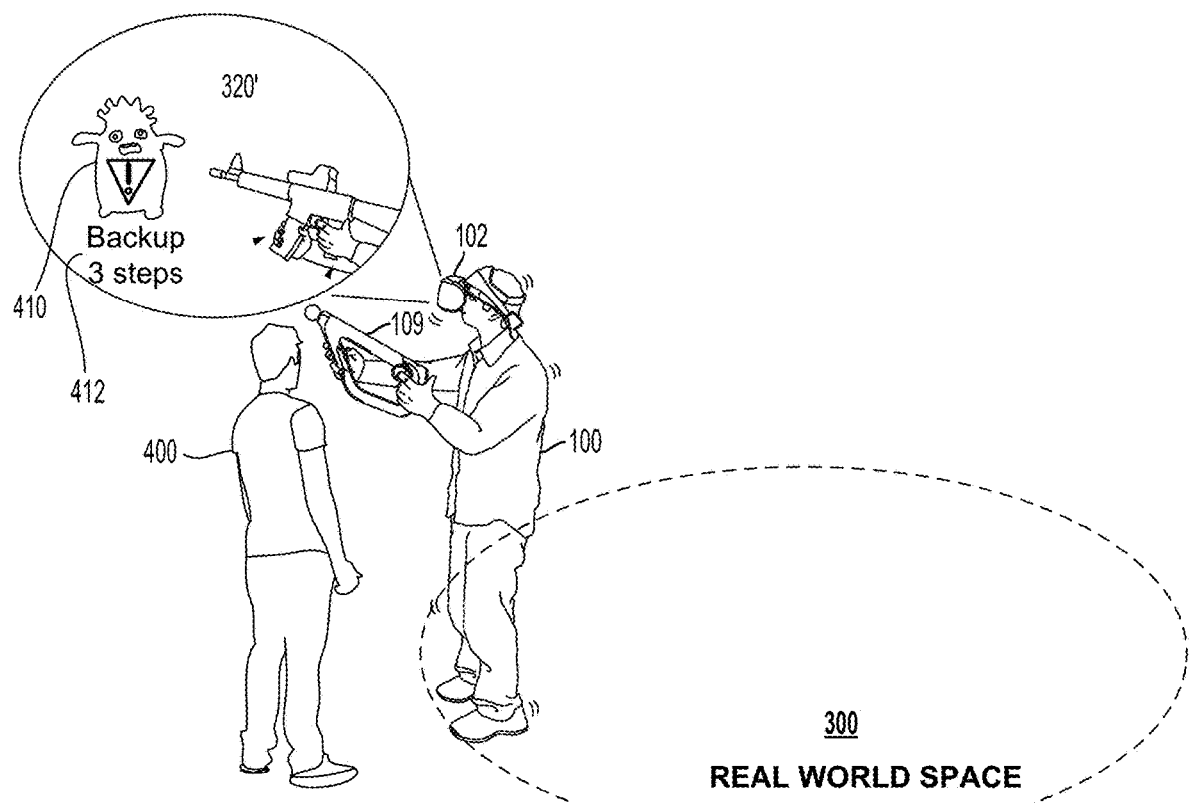
FIGS. 4A-4B illustrates an example of the user approaching an outer boundary of the real world space and the providing of guidance back to the safe zone, in accordance with one embodiment.

FIG. 4A illustrates an example of the user 100 approaching an outer boundary of the real world space 300. In one embodiment, the virtual-reality view 320' is augmented by including virtual-reality characters 410 and a message 412. The virtual-reality character 410, in one embodiment, is presented in some space within the virtual-reality view so as to alert the user 100. The message 412, in one embodiment can tell the user to backup 3 steps. As shown, the user 100 is also approaching another user 400, and the content presented in the virtual-reality view can also alert the user of another user that's proximate to him to avoid contact.

Figure 4B:
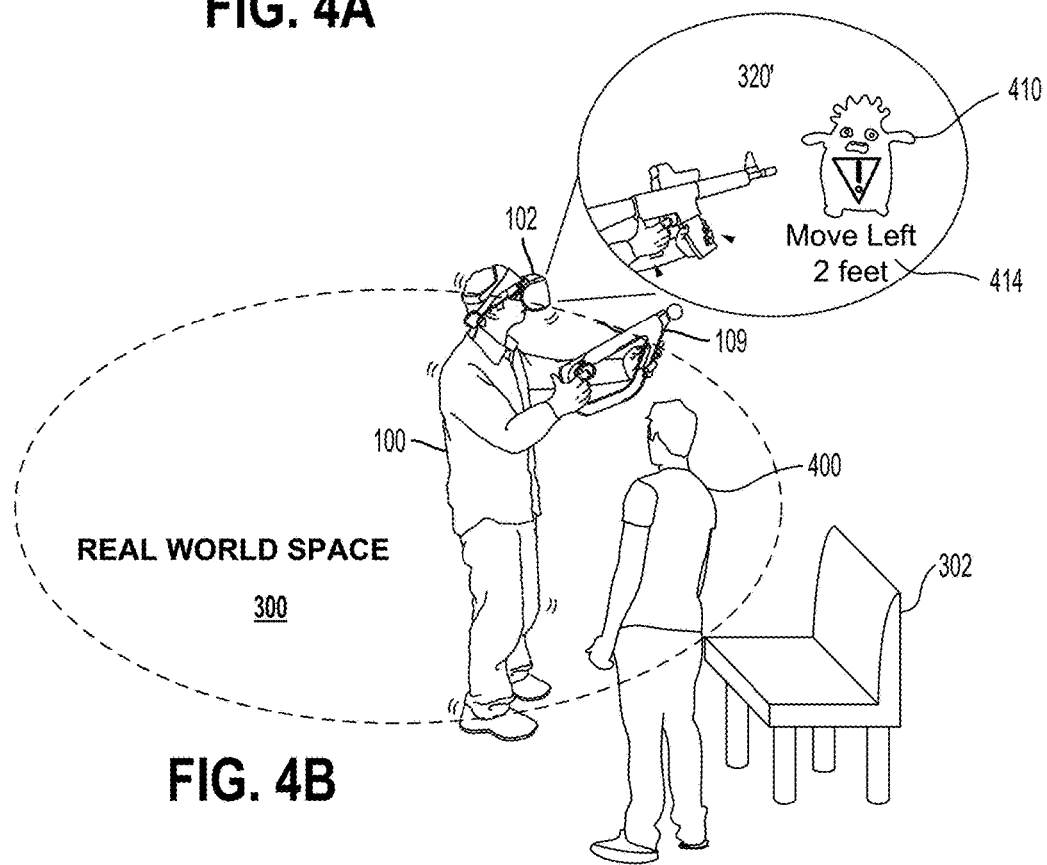

FIG. 4B illustrates an example of the user 100 interacting in the virtual-reality view 320', and receiving another virtual-reality character 410 and message 414. In this example, the user is being guided to move to the left two feet. As shown, the information provided to the user 100 is not only an alert, but can also include guiding information so that the user can remain within the safe zone within the real world space 300. Providing this information is an efficient way to avoid having the user 100, who may be immersed in the virtual-reality space, from bumping into real world objects.

An additional advantage is that the user 100 is not need to remove his HMD 102, when the user bumps into something. In some embodiments, the messages provided in the virtual-reality space can identify what the object is. By way of example, the user 100 can be provided with a message that indicates that a chair is proximate to the user, e.g., one foot to the right. The message can also identify that a person is standing next to him on his right. The message can also identify the person standing next to him, such as "your brother is standing next to you." Other messages can also identify whether another user wishes or is signaling a wish to talk to the HMD user. In any one of these examples, messages, content, and guidance can be provided to the user 100 directly in the virtual-reality space.

Figure 5A:
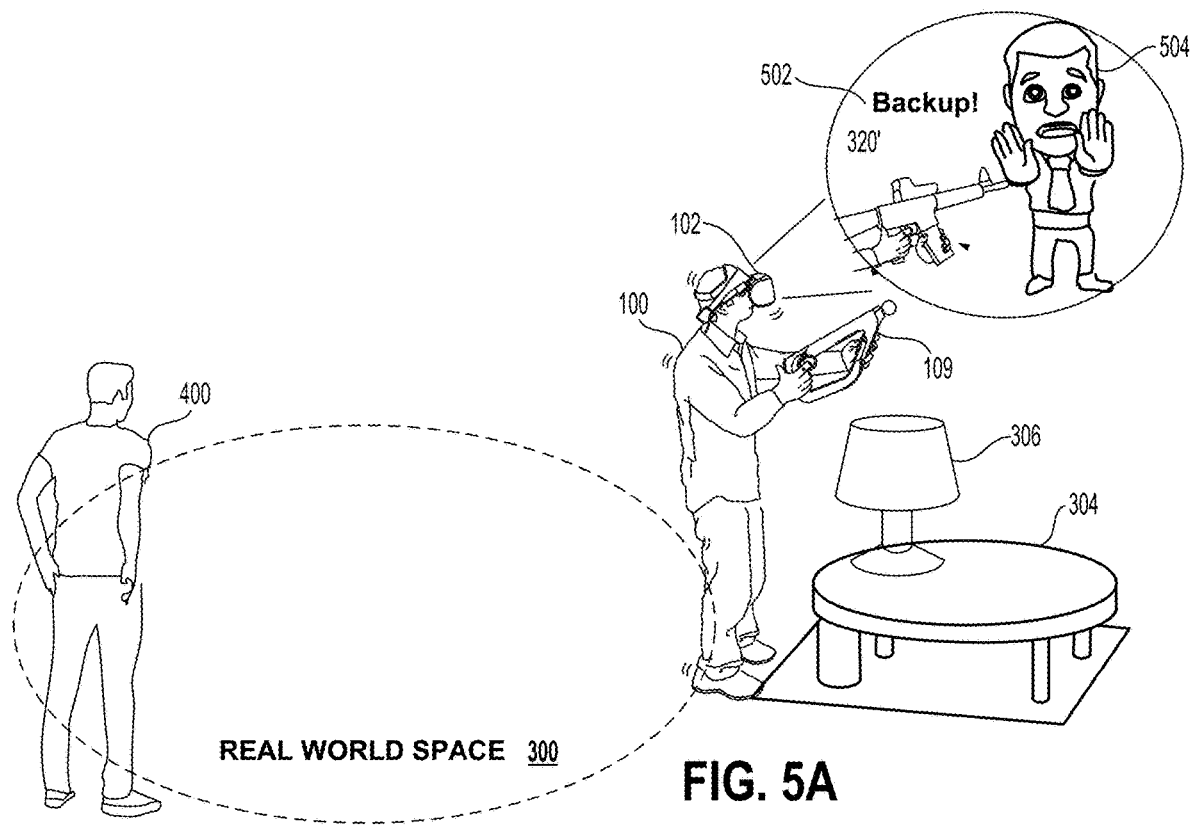
FIGS. 5A-5B illustrates an example where the user is provided with more animated characters in the virtual-reality space, to provide guidance back into the safe zone, in accordance with one embodiment.

FIG. 5A illustrates an example where the user 100 is provided with more animated characters 504 in the virtual-reality space, to provide guidance back into the safe zone, in accordance with one embodiment. As shown, the user 100 has wandered off to the right of the safe zone, and is approaching the coffee table 304 and the lamp 306. Because the user is approaching physical objects that can be broken, or can cause injury to the user 100, the user 100 is provided with more significant alerts in the virtual-reality space 320'.

In this example, a message 502 is provided to the user, requesting that the user backup, and an image character 504 is shown holding up his hands, indicating to the user 100 to stop. The animated character 504 is simply an example of a type of character they can be integrated into the virtual-reality scene, while still showing virtual-reality content. The virtual-reality content that is still being shown is the virtual-reality weapon, which is being used within the virtual-reality scene.

Figure 5B:
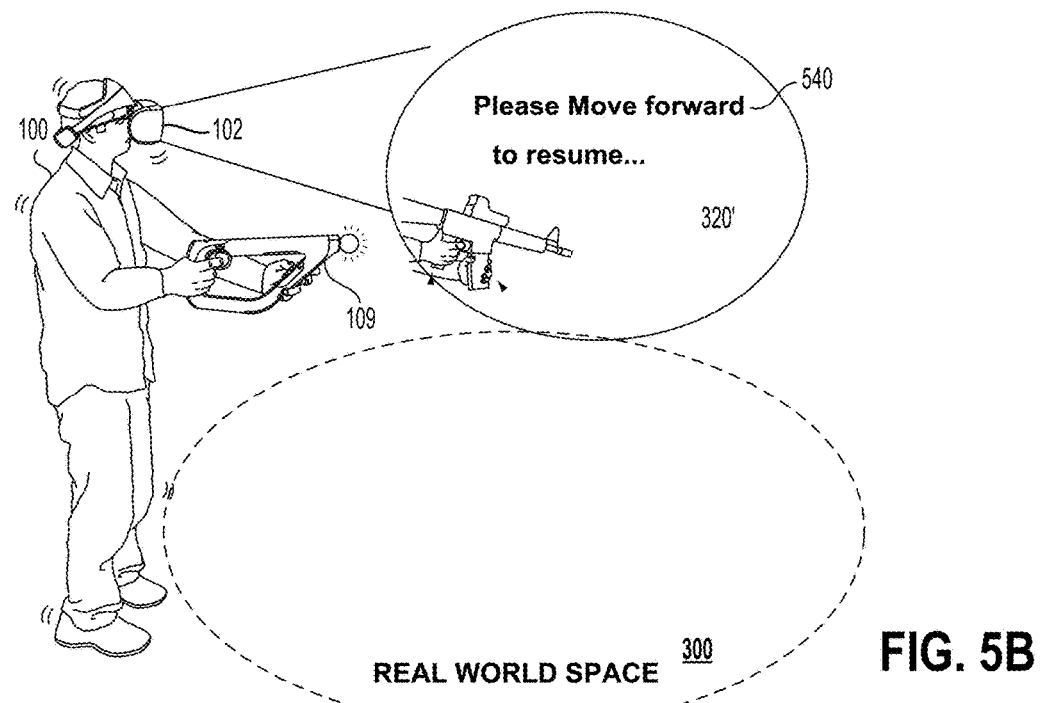

FIG. 5B illustrates another example, where a message 540 is provided to the user in the virtual-reality scene 320', in accordance with one embodiment. In this example, the user is provided with the message that indicates "please move forward to resume." This message is indicating to the user 100 that the interactivity in the virtual-reality space has been stopped or paused. The stopping and pausing of the content is automatic, when the user steps out of the virtual-reality space 300 where it is safe to interact and move. Once the user moves forward into the virtual-reality space 300 where it is safe to interact, the content in the virtual-reality space can be resumed.

As such, the pausing and resuming of content in the virtual-reality space can be automatic, based on whether the user is in or out of the safe zone. In some embodiments, the forward-looking cameras of the HMD 102 can also be turned on, to provide the user 100 with a view of the real-world space, if the user is approaching, about to interact with, about the hit, about to enter a danger zone, or should be warned about possible danger. In this way, in addition to providing messages and graphics within the virtual-reality content to guide the user back into a safe zone, the user can also be provided with a pass-through or see-through view of the real world. In one embodiment, the pass-through or see-through view of the real world is turned on, if the user does not follow the guidance to move back into the real-world space, to allow the user to determine whether to stay out of the real-world space, or take action to avoid injury.

Figure 6:
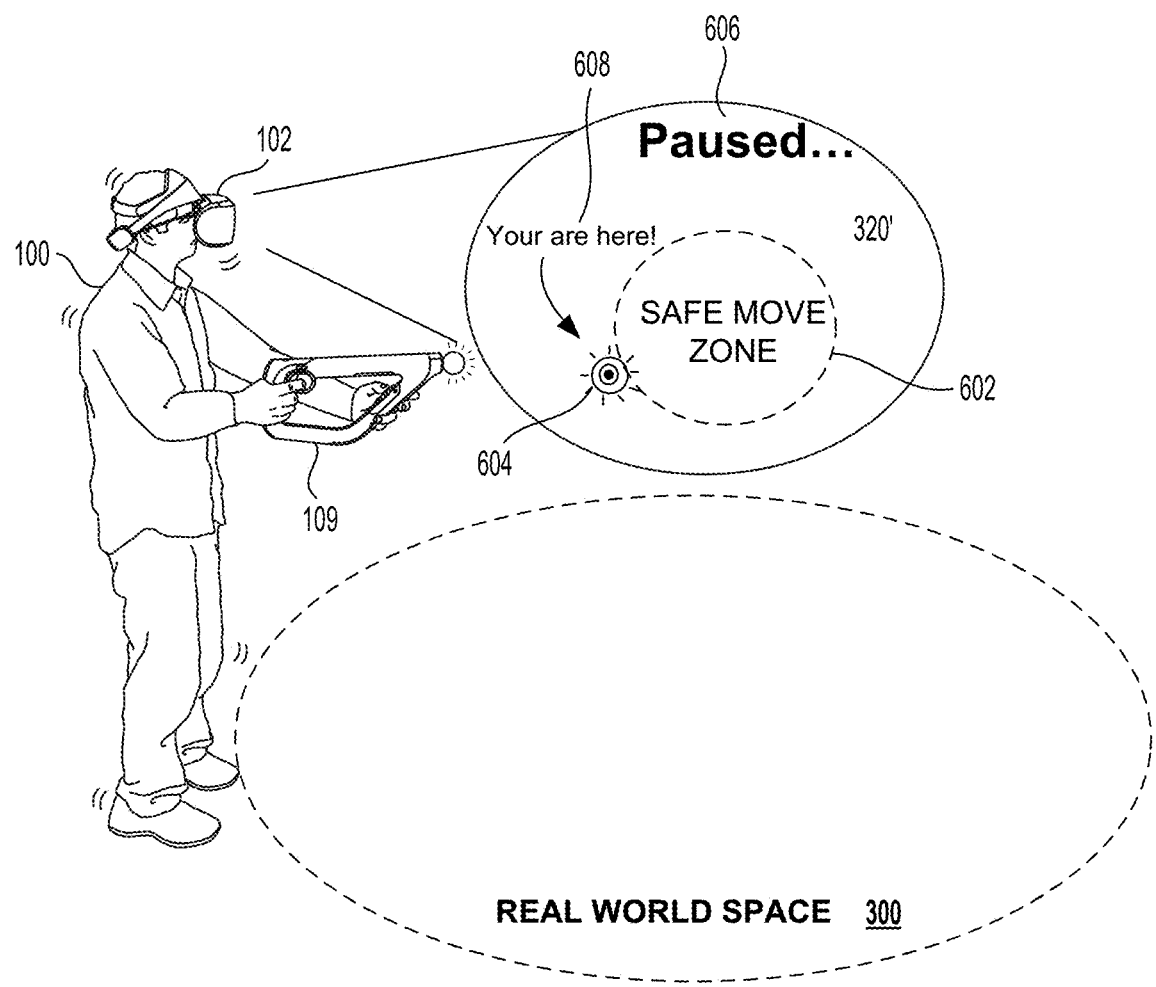
FIG. 6 illustrates an example of that user, interacting with a virtual-reality space, in accordance with one embodiment.

FIG. 6 illustrates an example of that user 100, interacting with a virtual-reality space, in accordance with one embodiment. In this example, the user 100 is shown virtual-reality content 320', which indicates that the content has been paused by message 606. In addition, the user is provided with a bird's eye view or overhead view 602 of the space in which the user is interacting. The overhead view 602 is mapped or parallels to the real world space 320, and also provides information as to where the user 100 is relative to the real world space 300. As such, in indicator 604 can be placed in the virtual world space, to indicate the location of user 100 relative to the real world space 300. A message 608 can also be provided, in one embodiment, to indicate to the user where he is relative to the safe move zone contained within the overhead view 602. This provides the user with a type of personal radar, showing the user where the user can move to move back into the safe zone. In one embodiment, as the user moves towards the middle of the safe zone, the indicator 604 will also move, assuring the user 100 that he or she is moving in the right direction. Once in the safe zone, the content can either be automatically restarted or resumed, or can be resumed by command of the user 100.

Figure 7A:
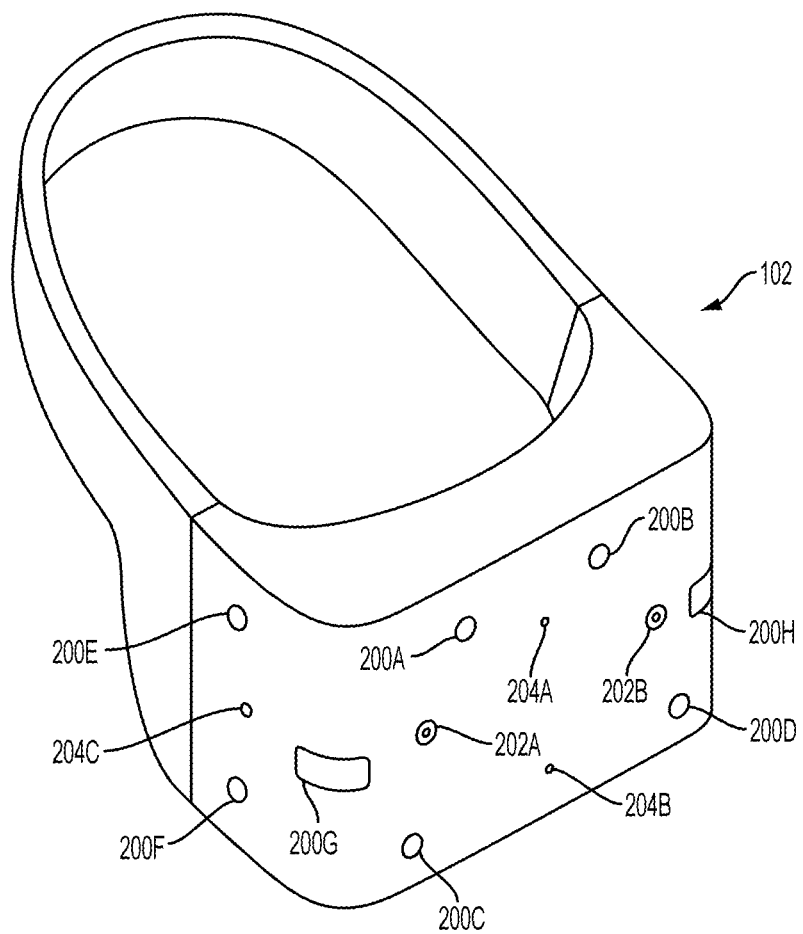
FIG. 7A illustrates a head-mounted display (HMD), in accordance with an embodiment of the disclosure.

FIG. 7A illustrates a head-mounted display (HMD), in accordance with an embodiment of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity.

For example, some or all of the lights may be configured to have a certain color arrangement, intensity arrangement, be configured to blink, have certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 7B:
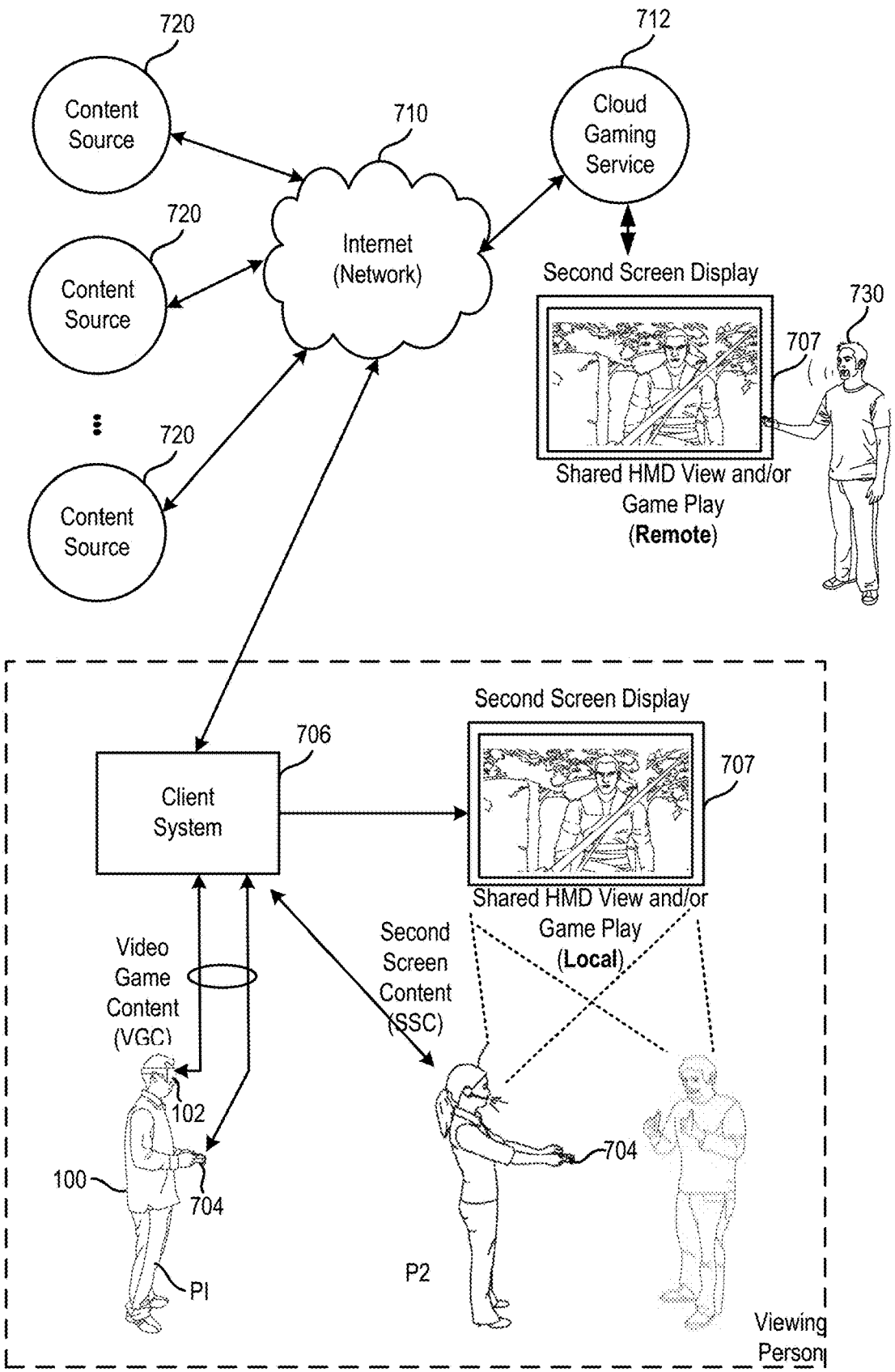
FIG. 7B illustrates one example of an HMD user interfacing with a client system, and the client system providing content to a second screen display, which is referred to as a second screen.

FIG. 7B illustrates one example of an HMD 102 user interfacing with a client system 706, and the client system 706 providing content to a second screen display, which is referred to as a second screen 707. As will be described below, the client system 706 may include integrated electronics for processing the sharing of content from the HMD 102 to the second screen 707. Other embodiments may include a separate device, module, connector, that will interface between the client system and each of the HMD 102 and the second screen 707. In this general example, user 100 is wearing HMD 102 and is playing a video game using controller 704. The interactive play by user 100 will produce video game content (VGC), which is displayed interactively to the HMD 102.

In one embodiment, the content being displayed in the HMD 102 is shared to the second screen 707. In one example, a person viewing the second screen 707 can view the content being played interactively in the HMD 102 by user 100. In another embodiment, another user (e.g. player 2) can interact with the client system 706 to produce second screen content (SSC). The second screen content produced by a player also interacting with the controller 704 (or any type of user interface, gesture, voice, or input), may be produced as SSC to the client system 706, which can be displayed on second screen 707 along with the VGC received from the HMD 102.

Accordingly, the interactivity by other users who may be co-located or remote from an HMD user can be social, interactive, and more immersive to both the HMD user and users that may be viewing the content played by the HMD user on a second screen 707. As illustrated, the client system 706 can be connected to the Internet 710. The Internet can also provide access to the client system 706 to content from various content sources 720. The content sources 720 can include any type of content that is accessible over the Internet.

Such content, without limitation, can include video content, movie content, streaming content, social media content, news content, friend content, advertisement content, etc. In one embodiment, the client system 706 can be used to simultaneously process content for an HMD user, such that the HMD is provided with multimedia content associated with the interactivity during gameplay. The client system 706 can then also provide other content, which may be unrelated to the video game content to the second screen. The client system 706 can, in one embodiment receive the second screen content from one of the content sources 720, or from a local user, or a remote user.

Figure 8:
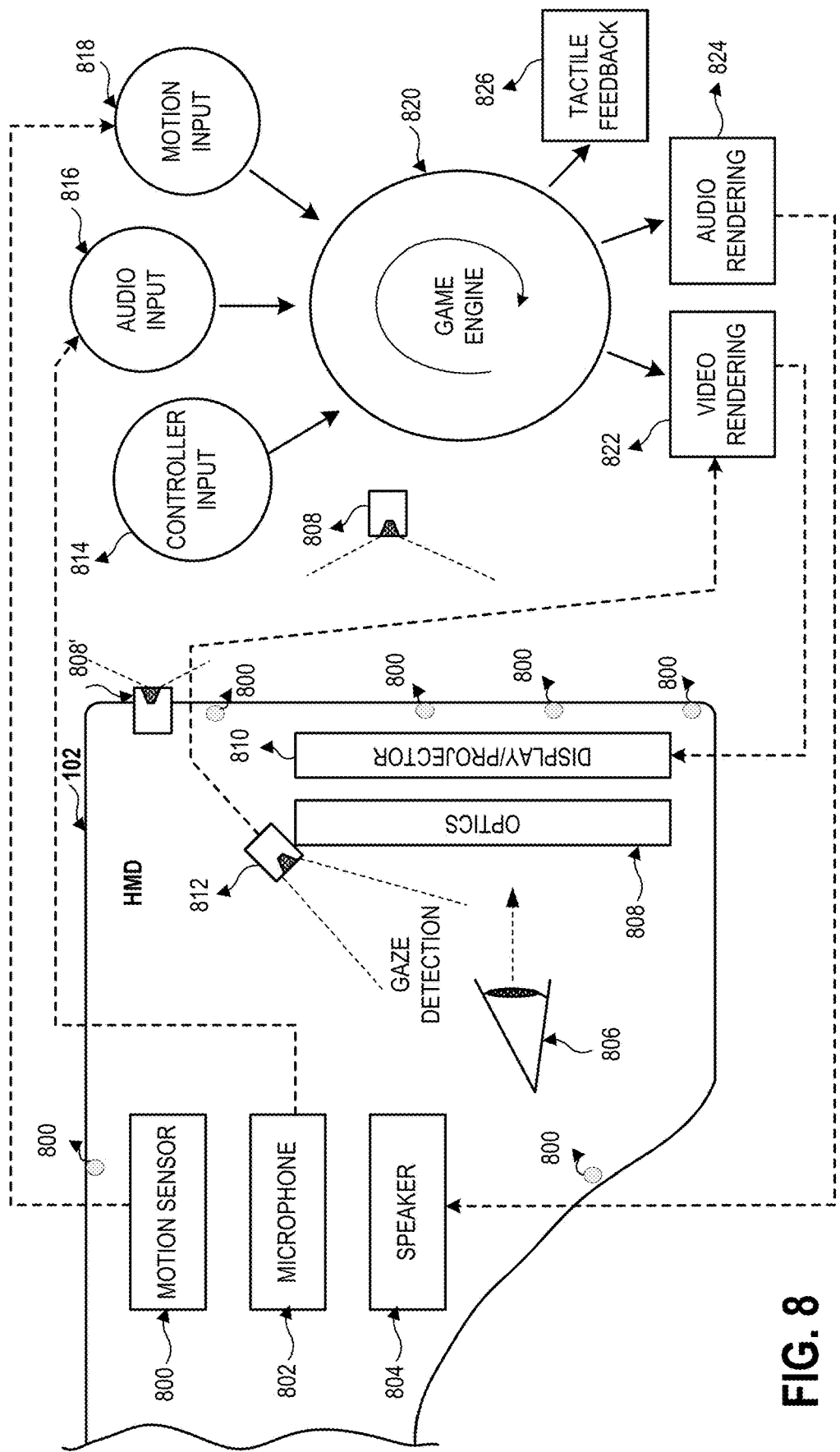
FIG. 8 conceptually illustrates the function of the HMD in conjunction with an executing video game, in accordance with an embodiment of the disclosure.

FIG. 8 conceptually illustrates the function of the HMD 102 in conjunction with an executing video game, in accordance with an embodiment of the disclosure. The executing video game is defined by a game engine 820 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 814, audio input 816 and motion input 818. The controller input 814 may be defined from the operation of a gaming controller separate from the HMD 102, such as a handheld gaming controller (e.g. Sony DUALSHOCK®4 wireless controller, Sony PlayStation® Move motion controller) or glove interface object 104a. By way of example, controller input 814 may include directional inputs, button presses, trigger activation, movements, gestures, or other kinds of inputs processed from the operation of a gaming controller. The audio input 816 can be processed from a microphone 802 of the HMD 102, or from a microphone included in the image capture device 108 or elsewhere in the local environment. The motion input 818 can be processed from a motion sensor 800 included in the HMD 102, or from image capture device 108 as it captures images of the HMD 102. The game engine 820 receives inputs which are processed according to the configuration of the game engine to update the game state of the video game.

The game engine 820 outputs game state data to various rendering modules which process the game state data to define content which will be presented to the user.

In the illustrated embodiment, a video rendering module 822 is defined to render a video stream for presentation on the HMD 102. The video stream may be presented by a display/projector mechanism 810, and viewed through optics 808 by the eye 806 of the user. An audio rendering module 804 is configured to render an audio stream for listening by the user. In one embodiment, the audio stream is output through a speaker 804 associated with the HMD 102. It should be appreciated that speaker 804 may take the form of an open air speaker, headphones, or any other kind of speaker capable of presenting audio.

In one embodiment, a gaze tracking camera 812 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 812, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 826 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

At present, streaming services for sharing game replays are very popular. The DualShock®4 wireless controller includes a "share button" directly on the controller to enable such sharing. Implementations of the present disclosure improve sharing replays for people who wish to explore the replays using an HMD/VR headset. Implementations of the present disclosure provide for rendering of a game replay with a very wide field of view to allow the spectator to move his head freely using an HMD and view the replay from novel vantage points. The traditional streaming approach would limit the replay to only what the original player viewed, so that the view direction would be independent of the spectator's head position and orientation, and if the spectator using an HMD moved his head, nothing would change.

Implementations of the disclosure provide for the rendering of videos in a wide enough field of view to support novel viewpoints in an HMD. A custom build of a game engine that runs on a cloud server (e.g. on console gaming hardware, e.g. PlayStation®4 hardware, in the cloud), that accepts as input game state streamed from the original player's game engine and uses it to render an extremely wide field of view (e.g. 150 degree plus) view of the game, that can then be used for real-time streaming and/or pre-recorded playback of that game session. It will be appreciated that the extremely wide field of view is in excess of the HMD's field of view, allowing for the spectator wearing the HMD to look around in the replay. The actual game is configured to stream its state to the networked version of the engine.

As described above, there is a need to provide users the ability to spectate, e.g., watch the interactive activity being experienced by users wearing HMDs 102. For example, one HMD virtual reality player may be immersed in the activity presented in the HMD, while other persons may be co-located with the player. These other co-located players may find enjoyment in watching the interactivity experienced or virtual reality scene being viewed by the HMD player. As used herein, an HMD player is one that is viewing content presented on the HMD, or can be one that is interacting with some content resented on the HMD, or can be playing a game presented on the HMD. As such, reference to the player, is only made with reference to the user that is wearing the HMD, irrespective of the type of content being presented on the HMD.

In still other embodiments, other persons that are not co-located with the HMD player may wish to view the content, interactivity, or media being presented in the HMD of the HMD player. For instance, a website may be provided to present users with the ability to select from different HMD players, so as to watch and spectate while the HMD player performs his or her activities. This example is similar to standard Twitch-type experiences, which allow users connected to the Internet to access the website and search for different types of content or media being played by remote players. The remote players may, in some embodiments, be playing games using an HMD 102.

In other embodiments, the remote players may be playing games or watching content using a display screen of a device or a television display screen. Broadly speaking, users wishing to watch the activity of another player that is remote, e.g., over a website, can then select specific players or types of games, or thumbnails of the games, or thumbnails of the content, to view the activity being directed by the HMD player. Thus, a website can be provided that enables users to view and select specific interactive content that may be actively played by a remote HMD player. The remote viewer wishing to view the activity by the HMD player, can simply click on that content and begin watching.

Figure 9:
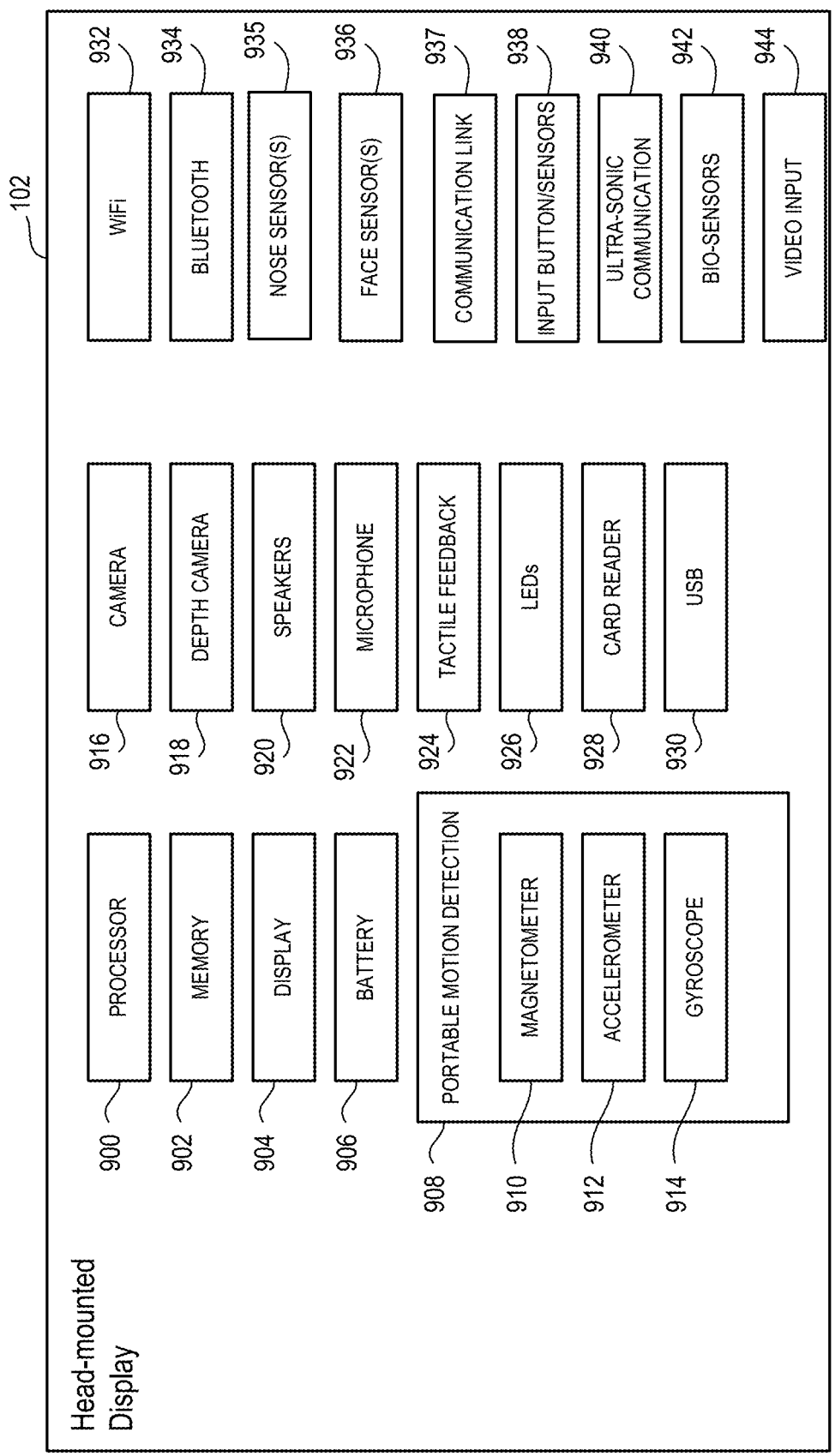
FIG. 9 illustrates components of a head-mounted display, in accordance with an embodiment of the disclosure.

With reference to FIG. 9, a diagram illustrating components of a head-mounted display 102 is shown, in accordance with an embodiment of the disclosure. The head-mounted display 102 includes a processor 900 for executing program instructions. A memory 902 is provided for storage purposes, and may include both volatile and non-volatile memory. A display 904 is included which provides a visual interface that a user may view. A battery 906 is provided as a power source for the head-mounted display 102. A motion detection module 908 may include any of various kinds of motion sensitive hardware, such as a magnetometer 910, an accelerometer 912, and a gyroscope 914.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 912 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 910 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 912 is used together with magnetometer 910 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 914 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 916 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 918 may be included in the head-mounted display 102 for sensing depth information of objects in a real environment.

The head-mounted display 102 includes speakers 920 for providing audio output. Also, a microphone 922 may be included for capturing audio from the real environment, including sounds from the ambient environment, speech made by the user, etc. The head-mounted display 102 includes tactile feedback module 924 for providing tactile feedback to the user. In one embodiment, the tactile feedback module 924 is capable of causing movement and/or vibration of the head-mounted display 102 so as to provide tactile feedback to the user.

LEDs 926 are provided as visual indicators of statuses of the head-mounted display 102. For example, an LED may indicate battery level, power on, etc. A card reader 928 is provided to enable the head-mounted display 102 to read and write information to and from a memory card. A USB interface 930 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 932 is included for enabling connection to the Internet or a local area network via wireless networking technologies. Also, the head-mounted display 102 includes a Bluetooth module 934 for enabling wireless connection to other devices. In one embodiment, the HMD 102 can also include nose sensors 935. The nose sensors can be defined by one or more proximity sensors, which can include one or more of optical sensors, cameras, camera sensors, infrared (IR) sensors, ultrasonic sensors, depth sensors, three-dimensional imaging sensors, point-distance capturing sensors, RGB cameras, multiple point cameras, color sensing cameras, or combinations of two or more thereof. The face sensors 936, for example, can include imaging cameras, motion detection cameras, image sensing cameras, ultrasonic sensors, depth sensors, three-dimensional imaging sensors, infrared sensors, ultrasonic imagers, or combinations thereof, or similar or additional cameras that may be also utilized or used in conjunction with the nose sensors 935. In some embodiments, the face sensors 936 can also include cameras that are exterior to the HMD 102, such as those that may be facing the user's mouth, chin, jawline, or the like.

A communications link 937 may also be included for connection to other devices. In one embodiment, the communications link 937 utilizes infrared transmission for wireless communication. In other embodiments, the communications link 937 may utilize any of various wireless or wired transmission protocols for communication with other devices.

Input buttons/sensors 938 are included to provide an input interface for the user. Any of various kinds of input interfaces may be included, such as buttons, touchpad, joystick, trackball, etc. An ultra-sonic communication module 940 may be included in head-mounted display 102 for facilitating communication with other devices via ultra-sonic technologies.

Bio-sensors 942 are included to enable detection of physiological data from a user. In one embodiment, the bio-sensors 942 include one or more dry electrodes for detecting bio-electric signals of the user through the user's skin.

A video input 944 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 10:
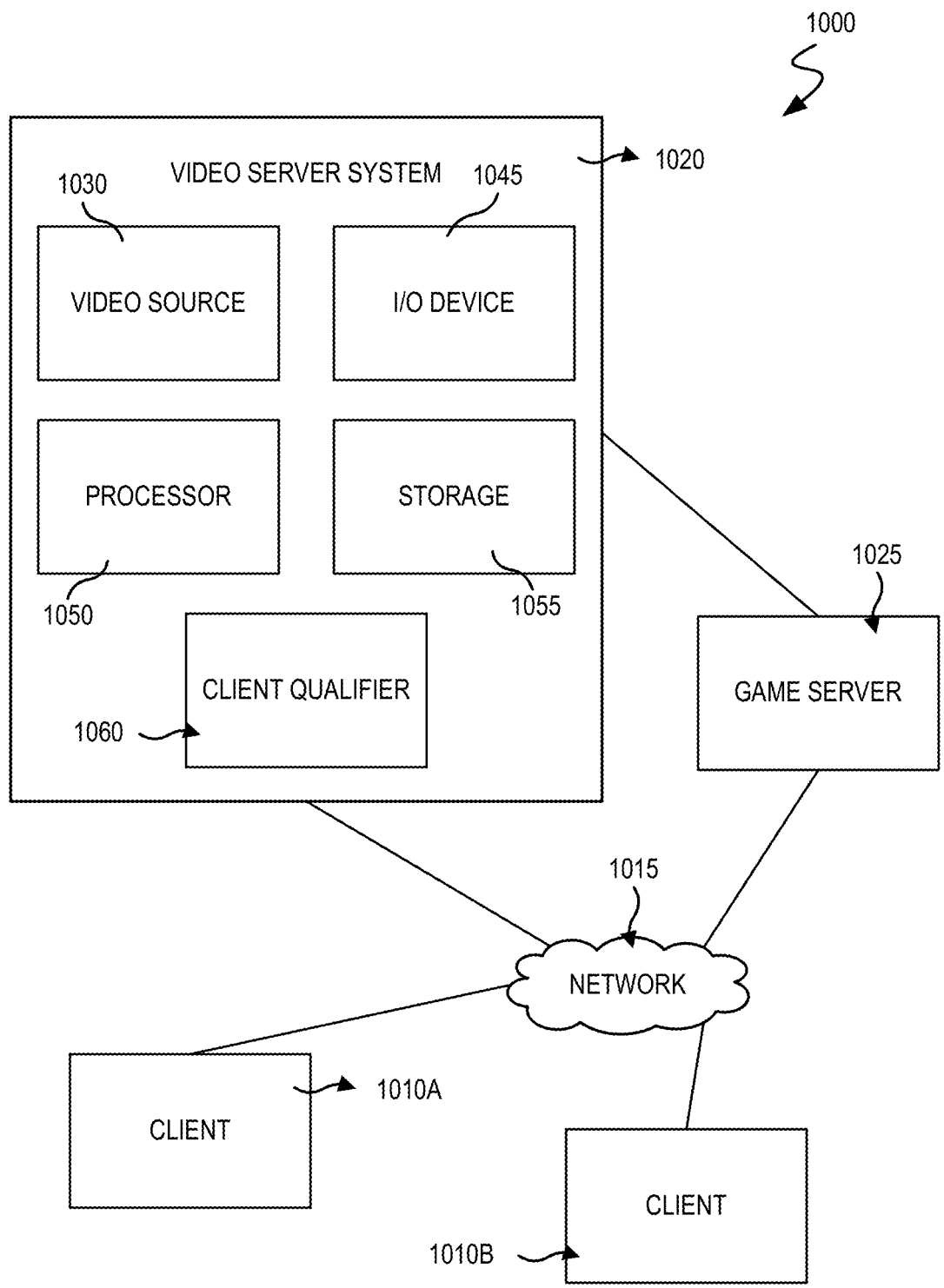
FIG. 10 is a block diagram of a Game System, according to various embodiments of the disclosure.

FIG. 10 is a block diagram of a Game System 1000, according to various embodiments of the disclosure. Game System 1000 is configured to provide a video stream to one or more Clients 1010 via a Network 1015. Game System 1000 typically includes a Video Server System 1020 and an optional game server 1025. Video Server System 1020 is configured to provide the video stream to the one or more Clients 1010 with a minimal quality of service. For example, Video Server System 1020 may receive a game command that changes the state of or a point of view within a video game, and provide Clients 1010 with an updated video stream reflecting this change in state with minimal lag time. The Video Server System 1020 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1010, referred to herein individually as 1010A, 1010B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1010 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1010 or on a separate device such as a monitor or television. Clients 1010 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1010 are optionally geographically dispersed. The number of clients included in Game System 1000 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1020 to deliver a game viewed through the HMD. In one embodiment, the game console receives the video stream from the video server system 1020, and the game console forwards the video stream, or updates to the video stream, to the HMD for rendering.

Clients 1010 are configured to receive video streams via Network 1415. Network 1015 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1010 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1010 may, but are not required to, further include systems configured for modifying received video. For example, a Client may be configured to perform further rendering, to overlay one video image on another video image, to crop a video image, and/or the like. For example, Clients 1010 may be configured to receive various types of video frames, such as I-frames, P-frames and B-frames, and to process these frames into images for display to a user. In some embodiments, a member of Clients 1010 is configured to perform further rendering, shading, conversion to 3-D, or like operations on the video stream. A member of Clients 1010 is optionally configured to receive more than one audio or video stream. Input devices of Clients 1010 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1010 is generated and provided by Video Server System 1020. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1010 are typically configured to receive inputs from a user. These inputs may include game commands configured to change the state of the video game or otherwise affect game play. The game commands can be received using input devices and/or may be automatically generated by computing instructions executing on Clients 1010. The received game commands are communicated from Clients 1010 via Network 1015 to Video Server System 1020 and/or Game Server 1025. For example, in some embodiments, the game commands are communicated to Game Server 1025 via Video Server System 1020. In some embodiments, separate copies of the game commands are communicated from Clients 1010 to Game Server 1025 and Video Server System 1020. The communication of game commands is optionally dependent on the identity of the command Game commands are optionally communicated from Client 1010A through a different route or communication channel that used to provide audio or video streams to Client 1010A.

Game Server 1025 is optionally operated by a different entity than Video Server System 1020. For example, Game Server 1025 may be operated by the publisher of a multiplayer game. In this example, Video Server System 1020 is optionally viewed as a client by Game Server 1025 and optionally configured to appear from the point of view of Game Server 1025 to be a prior art client executing a prior art game engine. Communication between Video Server System 1020 and Game Server 1025 optionally occurs via Network 1015. As such, Game Server 1025 can be a prior art multiplayer game server that sends game state information to multiple clients, one of which is game server system 1020. Video Server System 1020 may be configured to communicate with multiple instances of Game Server 1025 at the same time. For example, Video Server System 1020 can be configured to provide a plurality of different video games to different users. Each of these different video games may be supported by a different Game Server 1025 and/or published by different entities. In some embodiments, several geographically distributed instances of Video Server System 1020 are configured to provide game video to a plurality of different users. Each of these instances of Video Server System 1020 may be in communication with the same instance of Game Server 1025. Communication between Video Server System 1020 and one or more Game Server 1025 optionally occurs via a dedicated communication channel. For example, Video Server System 1020 may be connected to Game Server 1025 via a high bandwidth channel that is dedicated to communication between these two systems.

Video Server System 1020 comprises at least a Video Source 1030, an I/O Device 1045, a Processor 1050, and non-transitory Storage 1055. Video Server System 1020 may include one computing device or be distributed among a plurality of computing devices. These computing devices are optionally connected via a communications system such as a local area network.

Video Source 1030 is configured to provide a video stream, e.g., streaming video or a series of video frames that form a moving picture. In some embodiments, Video Source 1030 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1025. Game Server 1025 may maintain a copy of the state of the game based on game commands received from multiple players using geographically disperse clients. In these cases, the game state is provided by Game Server 1025 to Video Source 1030, wherein a copy of the game state is stored and rendering is performed. Game Server 1025 may receive game commands directly from Clients 1010 via Network 1015, and/or may receive game commands via Video Server System 1020.

Video Source 1030 typically includes rendering logic, e.g., hardware, firmware, and/or software stored on a computer readable medium such as Storage 1055. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1010. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1030 includes a video recording device such as a camera. This camera may be used to generate delayed or live video that can be included in the video stream of a computer game. The resulting video stream, optionally includes both rendered images and images recorded using a still or video camera. Video Source 1030 may also include storage devices configured to store previously recorded video to be included in a video stream. Video Source 1030 may also include motion or positioning sensing devices configured to detect motion or position of an object, e.g., person, and logic configured to determine a game state or produce video-based on the detected motion and/or position.

Video Source 1030 is optionally configured to provide overlays configured to be placed on other video. For example, these overlays may include a command interface, log in instructions, messages to a game player, images of other game players, video feeds of other game players (e.g., webcam video). In embodiments of Client 1010A including a touch screen interface or a gaze detection interface, the overlay may include a virtual keyboard, joystick, touch pad, and/or the like. In one example of an overlay a player's voice is overlaid on an audio stream. Video Source 1030 optionally further includes one or more audio sources.

In embodiments wherein Video Server System 1020 is configured to maintain the game state based on input from more than one player, each player may have a different point of view comprising a position and direction of view. Video Source 1030 is optionally configured to provide a separate video stream for each player based on their point of view. Further, Video Source 1030 may be configured to provide a different frame size, frame data size, and/or encoding to each of Client 1010. Video Source 1030 is optionally configured to provide 3-D video.

I/O Device 1045 is configured for Video Server System 1020 to send and/or receive information such as video, commands, requests for information, a game state, gaze information, device motion, device location, user motion, client identities, player identities, game commands, security information, audio, and/or the like. I/O Device 1045 typically includes communication hardware such as a network card or modem. I/O Device 1045 is configured to communicate with Game Server 1025, Network 1015, and/or Clients 1010.

Processor 1050 is configured to execute logic, e.g. software, included within the various components of Video Server System 1020 discussed herein. For example, Processor 1050 may be programmed with software instructions in order to perform the functions of Video Source 1030, Game Server 1025, and/or a Client Qualifier 1060. Video Server System 1020 optionally includes more than one instance of Processor 1050. Processor 1050 may also be programmed with software instructions in order to execute commands received by Video Server System 1020, or to coordinate the operation of the various elements of Game System 1000 discussed herein. Processor 1050 may include one or more hardware device. Processor 1050 is an electronic processor.

Storage 1055 includes non-transitory analog and/or digital storage devices. For example, Storage 1055 may include an analog storage device configured to store video frames. Storage 1055 may include a computer readable digital storage, e.g. a hard drive, an optical drive, or solid state storage. Storage 1015 is configured (e.g. by way of an appropriate data structure or file system) to store video frames, artificial frames, a video stream including both video frames and artificial frames, audio frame, an audio stream, and/or the like. Storage 1055 is optionally distributed among a plurality of devices. In some embodiments, Storage 1055 is configured to store the software components of Video Source 1030 discussed elsewhere herein. These components may be stored in a format ready to be provisioned when needed.

Video Server System 1020 optionally further comprises Client Qualifier 1060. Client Qualifier 1060 is configured for remotely determining the capabilities of a client, such as Clients 1010A or 1010B. These capabilities can include both the capabilities of Client 1010A itself as well as the capabilities of one or more communication channels between Client 1010A and Video Server System 1020. For example, Client Qualifier 1060 may be configured to test a communication channel through Network 1015.

Client Qualifier 1060 can determine (e.g., discover) the capabilities of Client 1010A manually or automatically. Manual determination includes communicating with a user of Client 1010A and asking the user to provide capabilities. For example, in some embodiments, Client Qualifier 1060 is configured to display images, text, and/or the like within a browser of Client 1010A. In one embodiment, Client 1010A is an HMD that includes a browser. In another embodiment, client 1010A is a game console having a browser, which may be displayed on the HMD. The displayed objects request that the user enter information such as operating system, processor, video decoder type, type of network connection, display resolution, etc. of Client 1010A. The information entered by the user is communicated back to Client Qualifier 1060.

Automatic determination may occur, for example, by execution of an agent on Client 1010A and/or by sending test video to Client 1010A. The agent may comprise computing instructions, such as java script, embedded in a web page or installed as an add-on. The agent is optionally provided by Client Qualifier 1060. In various embodiments, the agent can find out processing power of Client 1010A, decoding and display capabilities of Client 1010A, lag time reliability and bandwidth of communication channels between Client 1010A and Video Server System 1020, a display type of Client 1010A, firewalls present on Client 1010A, hardware of Client 1010A, software executing on Client 1010A, registry entries within Client 1010A, and/or the like.

Client Qualifier 1060 includes hardware, firmware, and/or software stored on a computer readable medium. Client Qualifier 1060 is optionally disposed on a computing device separate from one or more other elements of Video Server System 1020. For example, in some embodiments, Client Qualifier 1060 is configured to determine the characteristics of communication channels between Clients 1010 and more than one instance of Video Server System 1020. In these embodiments the information discovered by Client Qualifier can be used to determine which instance of Video Server System 1020 is best suited for delivery of streaming video to one of Clients 1010.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method for providing guidance to a user wearing a head mounted display (HMD), comprising,
    using a camera of the HMD to track the user wearing the HMD in a real-world space;
    identifying a safe zone within the real-world space for physical movements of the user during interaction with a virtual reality space via the HMD;
    tracking said physical movements of the user in the real-world space;
    integrating content into the virtual reality space, wherein at least a portion of the content is graphical content used to indicate relative position of the user with reference to the safe zone, the content is configured to provide descriptive direction information to guide the user toward the safe zone of the real-world space; and
    if the user continues to move away from the safe zone, pausing presentation of the virtual reality space to allow the user to re-enter the safe zone, and resuming the presentation when the user is in the safe zone.

2. The method of claim 1, further comprising,
identifying real-world objects in the real-world space using image data from the camera, wherein one or more of the real-world objects is identified as an obstacle to the user.

3. The method of claim 2, wherein the obstacle is used to define part of a boundary for the safe zone.

4. The method of claim 1, wherein the graphical content is rendered as an overlay graphic, the overlay graphic is used to assist in providing said guidance.

5. The method of claim 4, wherein the overlay graphic is configured to load in front of the user as viewed by the user wearing the HMD.

6. The method of claim 4, wherein the overlay graphic is removed when the user moves back to the safe zone while wearing the HMD.

7. The method of claim 4, wherein the overlay graphic is an animated image providing text and/or audio related to the guidance.

8. The method of claim 4, wherein the overlay graphic is an animated character providing text and/or audio related to the guidance to take one or more steps in a direction of movement until the user of the HMD is in the safe zone.

9. The method of claim 1, wherein obstacles in the real world space are used to define the safe zone, and the safe zone changes as obstacles are present or not present over time.

10. The method of claim 1, wherein the pausing occurs for a period of time during which the user wearing the HMD is determined to be outside of the safe zone.

11. The method of claim 1, wherein pausing the presentation further comprising,
turning on a see-through mode of the HMD to allow the user to view the real-world space, upon detecting the user continuing to move away from the safe zone.

12. The method of claim 1, wherein pausing the presentation further comprising,
providing a virtual overhead view that is mapped to the real-world space in which the user is interacting, the virtual overhead view presented as an overlay and includes an interactive indicator to identify relative location of the user with reference to the safe zone.

13. The method of claim 1, wherein the graphical content is selected to match context of the virtual reality space so as to appear native to content of the virtual reality space.

14. Computer readable media, being non-transitory, having program instructions for providing guidance to a user wearing a head mounted display (HMD), comprising,
program instructions for using a camera of the HMD to track the user wearing the HMD in a real-world space;
program instructions for identifying a safe zone within the real-world space for physical movements of the user during interaction with a virtual reality space via the HMD;
program instructions for tracking said physical movements of the user in the real-world space;
program instructions for integrating content into the virtual reality space, wherein at least a portion of the content is graphical content used to indicate relative position of the user with reference to the safe zone, the content is configured to provide descriptive direction information to guide the user toward the safe zone of the real-world space; and
program instructions for pausing presentation of the virtual reality space if the user continues to move away from the safe zone so as to allow the user to re-enter the safe zone, and resuming the presentation when the user is in the safe zone.

15. The computer readable media of claim 14, further comprising,
program instructions for identifying real-world objects in the real-world space using image data from the camera, wherein one or more of the real-world objects is identified as an obstacle to the user.

16. The computer readable media of claim 15, wherein the obstacle is used to define part of a boundary for the safe zone.

17. The computer readable media of claim 14, wherein the graphical content is rendered as an overlay graphic, the overlay graphic is used to assist in providing said guidance.

18. The computer readable media of claim 17, wherein the overlay graphic is configured to load in front of the user as viewed by the user wearing the HMD.

19. The computer readable media of claim 17, wherein the overlay graphic is removed when the user moves back to the safe zone while wearing the HMD.

20. The computer readable media of claim 17, wherein the overlay graphic is an animated image providing text and/or audio related to the guidance.

21. The computer readable media of claim 14, wherein program instructions for pausing the presentation further comprising,
program instructions for providing a virtual overhead view that is mapped to the real-world space in which the user is interacting, the virtual overhead view presented as an overlay and includes an interactive indicator to identify relative location of the user with reference to the safe zone.

\* \* \* \* \*